United States Patent
Tracey

(10) Patent No.: US 7,487,632 B2
(45) Date of Patent: Feb. 10, 2009

(54) METHOD OF CALCULATING AIRFLOW INTRODUCTION INTO AN AUTOMOTIVE EXHAUST AIR INJECTION SYSTEM

(75) Inventor: Timothy D. Tracey, Lakewood, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/563,375

(22) Filed: Nov. 27, 2006

(65) Prior Publication Data

US 2008/0120967 A1 May 29, 2008

(51) Int. Cl.
*F01N 3/00* (2006.01)

(52) U.S. Cl. ............................. 60/289; 60/274; 60/290; 60/293

(58) Field of Classification Search .................. 60/274, 60/289, 290, 291, 293, 277
See application file for complete search history.

(56) References Cited

U.S. PATENT DOCUMENTS

| | | | | |
|---|---|---|---|---|
| 4,064,693 A | * | 12/1977 | Shibata | 60/290 |
| 4,299,089 A | * | 11/1981 | Takeda | 60/290 |
| 4,328,668 A | * | 5/1982 | Miura | 60/290 |
| 4,450,684 A | * | 5/1984 | Otani et al. | 60/290 |
| 5,345,763 A | * | 9/1994 | Sato | 60/290 |
| 5,675,968 A | * | 10/1997 | Katashiba et al. | 60/276 |
| 6,438,937 B1 | | 8/2002 | Pont et al. | |
| 6,498,958 B1 | | 12/2002 | Tateishi et al. | |
| 6,912,845 B2 | * | 7/2005 | Hirooka | 60/285 |
| 6,966,177 B2 | * | 11/2005 | Koyama et al. | 60/277 |
| 6,983,590 B2 | | 1/2006 | Roelle et al. | |
| 7,010,908 B2 | * | 3/2006 | Koyama et al. | 60/277 |
| 7,065,958 B2 | | 6/2006 | Funk et al. | |
| 7,073,323 B2 | * | 7/2006 | Hirooka et al. | 60/289 |
| 7,107,758 B2 | * | 9/2006 | Hirooka | 60/277 |
| 7,140,177 B2 | * | 11/2006 | Koyama et al. | 60/289 |
| 2004/0074453 A1 | | 4/2004 | Roelle et al. | |
| 2005/0138919 A1 | | 6/2005 | Nakano et al. | |
| 2005/0241300 A1 | | 11/2005 | Nakano et al. | |
| 2006/0162728 A1 | | 7/2006 | Delache et al. | |

FOREIGN PATENT DOCUMENTS

| | | |
|---|---|---|
| JP | 54031819 | 3/1979 |
| JP | 08082211 | 3/1996 |
| JP | 2005023822 | 1/2005 |

* cited by examiner

*Primary Examiner*—Tu M Nguyen
(74) *Attorney, Agent, or Firm*—Gifford, Krass, Sprinkle, Anderson & Citkowski, P.C.

(57) ABSTRACT

Injection of secondary air into an exhaust of an automotive vehicle at a location upstream of a catalytic converter of the vehicle in which the airflow rate is calculated by the air injection system pressure and by the pulsation of the air injection system pressure in reference to stored values in a data table.

4 Claims, 5 Drawing Sheets

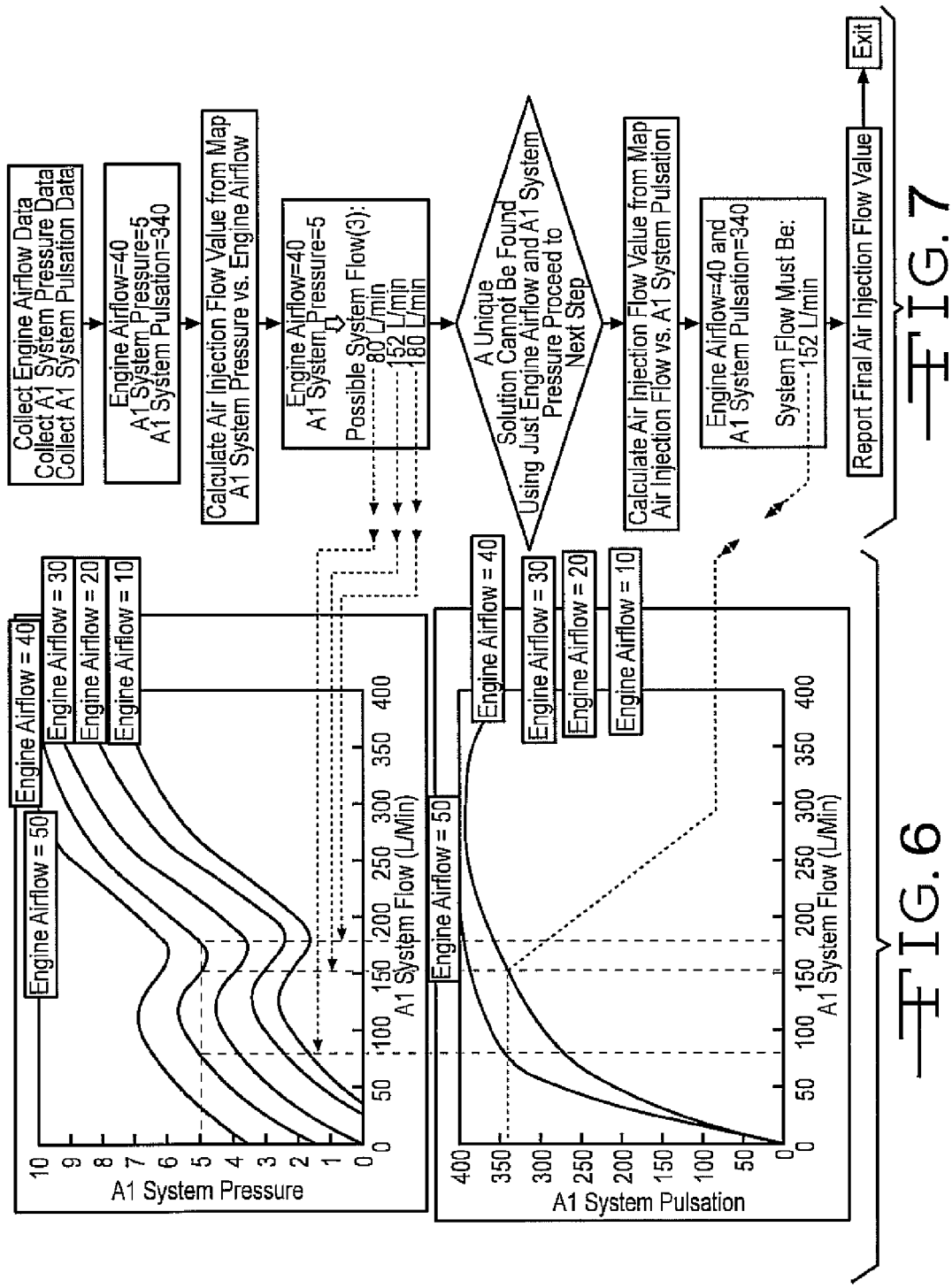

METHOD OF CALCULATING AIRFLOW INTRODUCTION INTO AN AUTOMOTIVE EXHAUST AIR INJECTION SYSTEM

FIELD OF THE INVENTION

This invention relates to a method of calculating the flow of air into an automotive exhaust air injection system.

BACKGROUND OF THE INVENTION

United States Published Patent Application 2005/0138919 A1 (Nakano et al.) discloses an apparatus for introducing secondary air into an automotive exhaust at a location on an upstream side of the catalytic converter in the exhaust pipe. In this reference, the airflow rate is controlled by an electronic control unit based on a difference between secondary air supply pressure and a shutoff pressure. The purpose of such a system is to decrease undesirable deterioration and exhaust emissions. While not stated in this reference, such a system is important at vehicle startup to increase the airflow in the exhaust, to thereby decrease the light-off time for the emissions catalyst, and the airflow rate must be regulated in accordance with Title 13 California Code Regulations Section 1968.2, Section E, Rule 5.2.1. Unfortunately, raw pressure values vary widely over time, and it has been the practice to average system pressure pulsations over time to produce a system pressure, but this approach is unable to take into account variations in system pressure pulsations and effects that such a factor can have on airflow rates.

BRIEF DESCRIPTION OF THE INVENTION

According to the present invention, airflow into a catalytic exhaust system at a location upstream of the catalyst is controlled by calculating system pressures as an average of cyclical pressure values over time, and by comparing such a calculated system pressure to engine intake air amount and input to a table that is derived from test data, this system adding system pressure fluctuations as a factor to the factors on which the table is based.

For a further understanding of the present invention, attention is directed to the drawing and the following brief description thereof, and to the appended claims.

BRIEF DESCRIPTION OF THE DRAWING

FIG. 6 is a graph showing stored system values using the practice of the method of FIG. 4;

FIG. 7 is a flowchart illustrating the steps that are used in the practice of the method of FIG. 4.

DETAILED DESCRIPTION OF THE INVENTION

Figure 1:
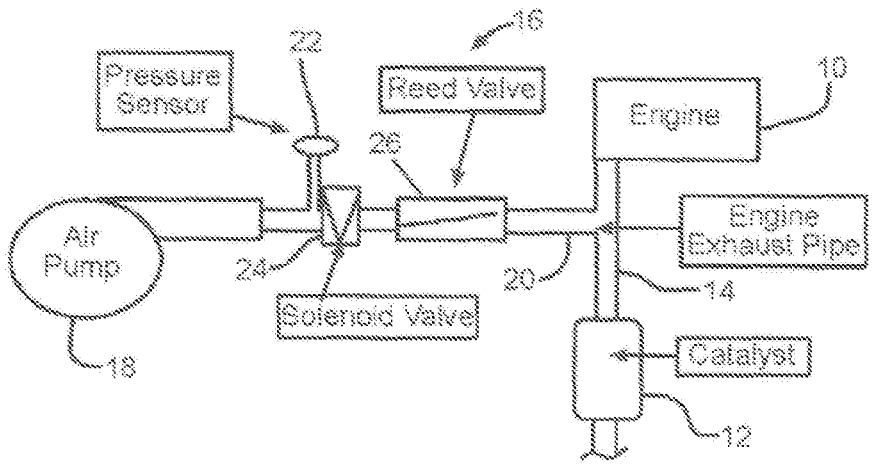
FIG. 1 is a schematic view of the equipment used in the practice of the present invention.

Equipment used in the practice of a secondary air injection system for introducing air into an automotive exhaust at a location upstream of a catalytic converter, both according to the prior art and according to the present invention, is illustrated in FIG. 1. Such equipment includes an engine 10, a catalytic converter 12, an air exhaust pipe 14 that leads from the engine 10 to the catalytic converter 12, and a secondary air injection system that is generally indicated by reference numeral 16. The secondary air injection system 16 includes an air pump 18 and a conduit 20 that leads from the air pump 18 to the exhaust pipe 14 at a location upstream of the catalytic converter 12.

The conduit 20 has a pressure sensor 22 to sense pressure in the conduit 20, an on-off solenoid valve 24 at a location downstream of the pressure sensor 22 to permit or prevent airflow through the conduit 20, and a variable flow Reed valve 26 to regulate the rate of airflow through the conduit 20.

Figure 2:
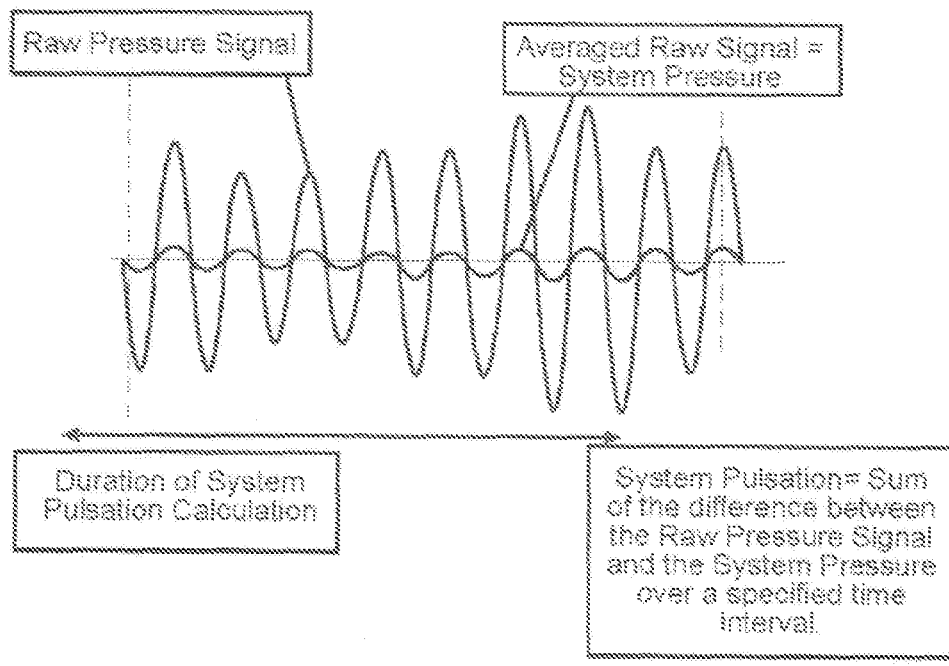
FIG. 2 is a graph showing variation in system air pressure over time in the practice of a method based on the equipment of FIG. 1.
Figure 3:
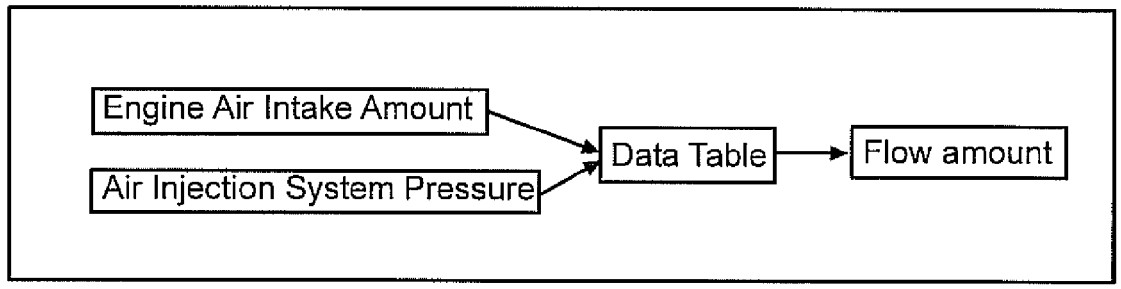
FIG. 3 is a schematic view of the steps followed in a prior art method using the equipment of FIG. 1.

During system operation, the pressure sensed by the pressure sensor 22 will vary over time between higher and lower values, as indicated by the Raw Pressure Signal graph in FIG. 2, in which the amplitude of the variation between the higher pressure values and the lower pressure values is quite large. These variations can be leveled by calculating an averaged raw pressure signal with pulsations of much smaller amplitude, as shown in FIG. 2 by the averaged Raw Pressure Signal graph in FIG. 2. As shown in FIG. 3, the airflow amount entering the exhaust pipe 14 from the conduit 20 is calculated as a function of engine air intake amount and the raw system pressure graph of FIG. 2 when compared to stored values in a data table.

Figure 4:
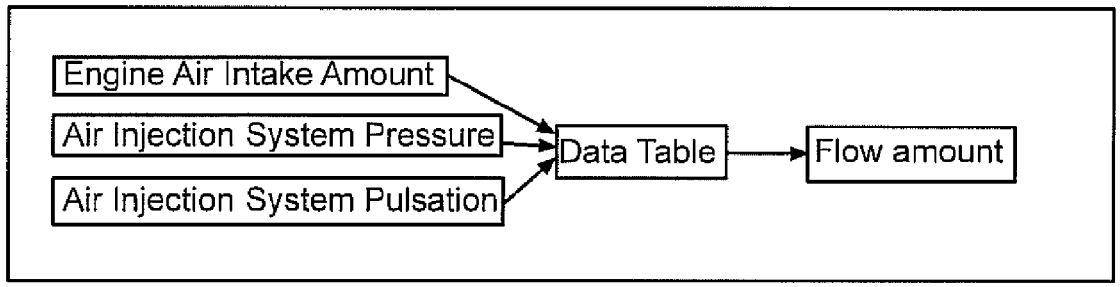
FIG. 4 is a view like FIG. 3 showing the steps followed in a method according to the present invention using the equipment of FIG. 1.

As shown in FIG. 4, the present invention differs from the system of FIG. 3 in that an additional factor, that of injection system pulsations, is taken into account in calculating airflow by factoring such system pressure fluctuations, with engine air intake and air injection system pressure, with stored values in a data table. This method requires no additional equipment to that illustrated in FIG. 1. Such system pressure pulsation, as shown in FIG. 2, is calculated as the difference between the raw pressure signal pressure curve in FIG. 2 and the averaged raw signal curve in FIG. 2, and was not heretofore taken into account in controlling secondary air injection system into a catalytically controlled automotive exhaust system.

Figure 5:
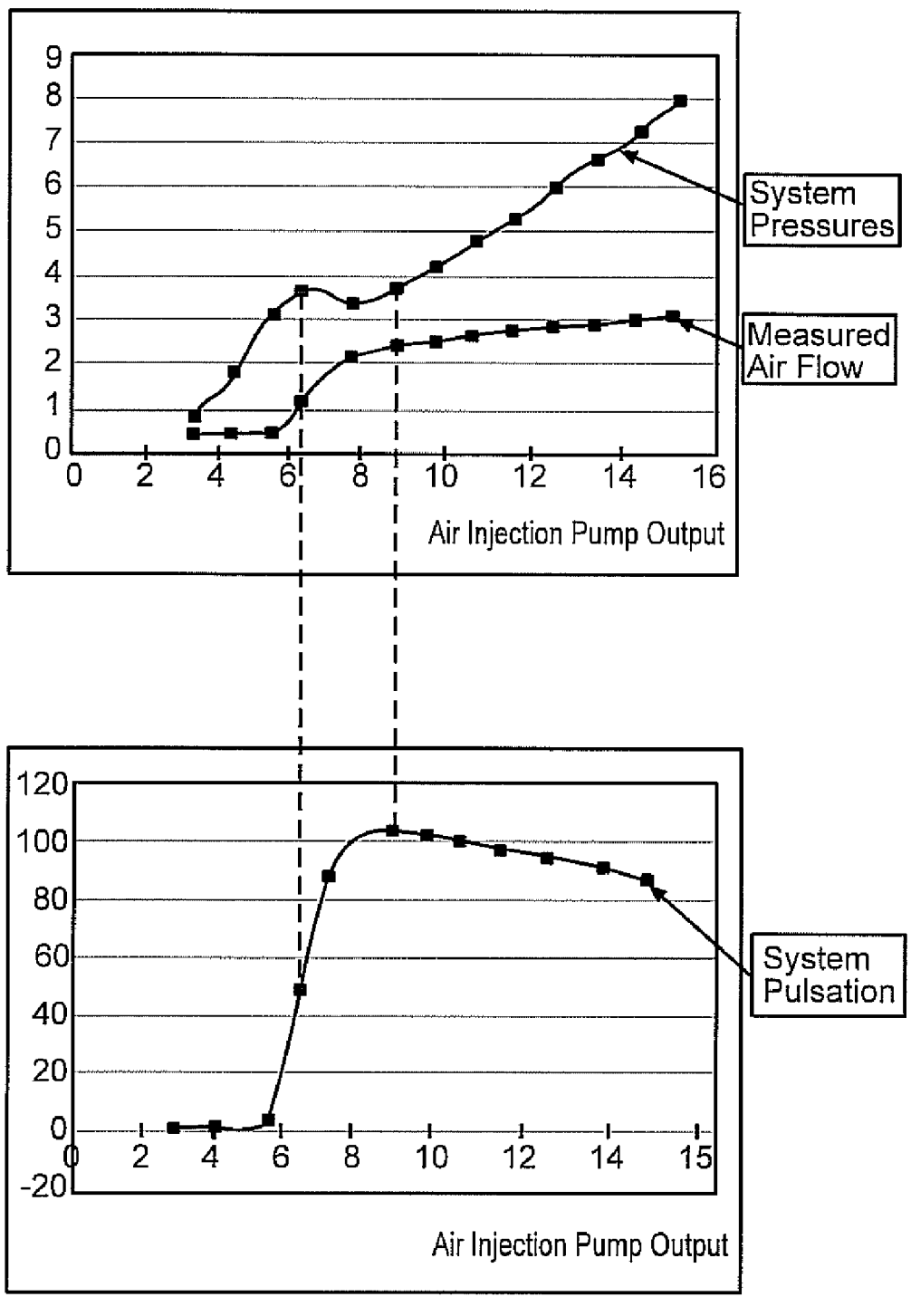
FIG. 5 is a graph showing measured airflow in a system of FIG. 4 as a function of system pressures and pressure pulsations.

FIG. 5 shows how measured airflow remains relatively constant when both system pressures and system pressure pulsations are taken into account in controlling measured airflow into a catalytically controlled exhaust system. FIG. 6 shows wide variations in engine airflow for various stored airflow rates as a function of only system pressure and much narrower variations in engine airflow for various stored airflow values when system pressure pulsations are also taken into account.

Figure 8:
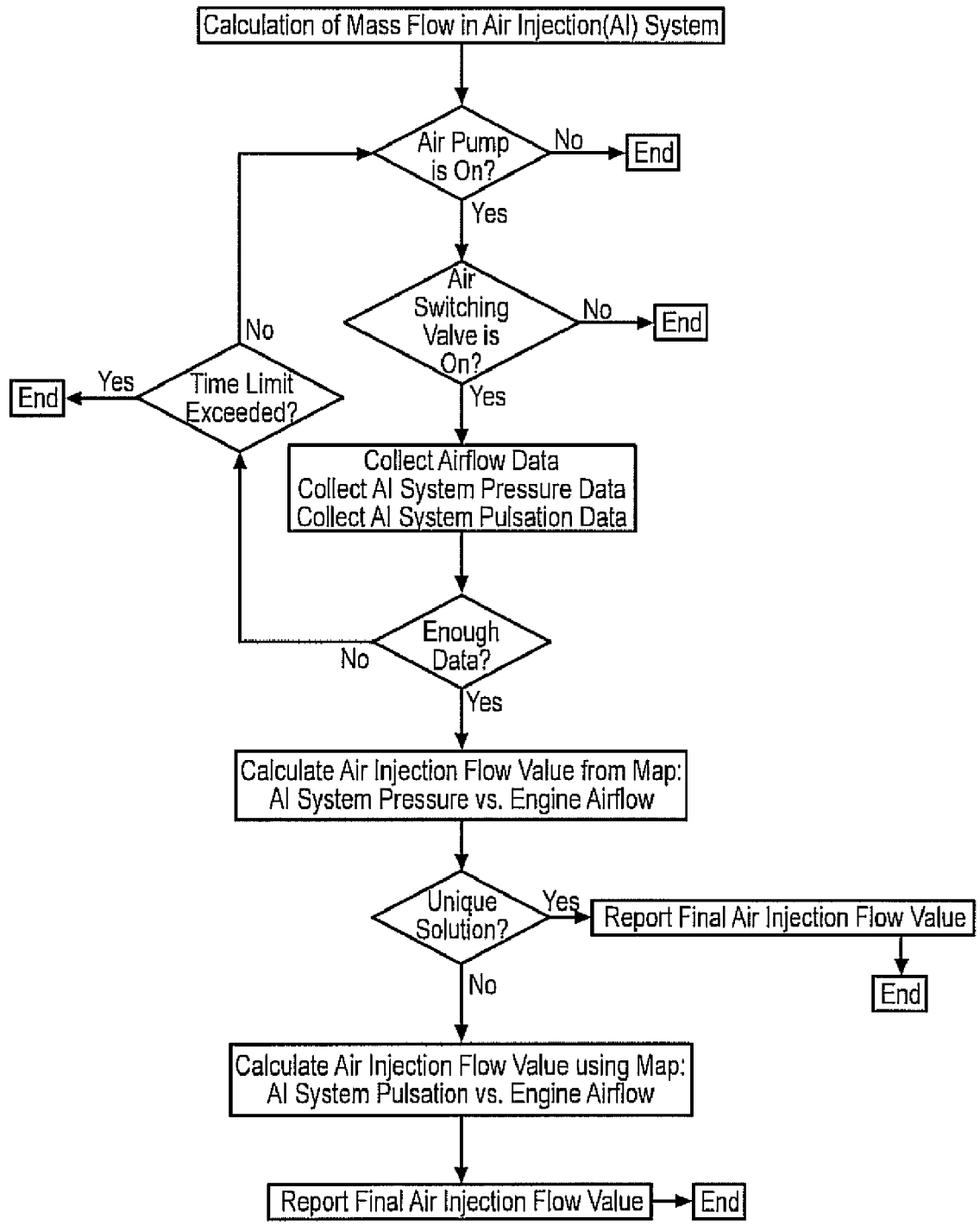
FIG. 8 is a flowchart illustrating the steps taken in calculating system airflow values using system pressure pulsation data.

FIG. 7 is a flowchart that illustrates the steps to be taken in using system pressure pulsations for various airflow rates from the stored values shown in FIG. 6. FIG. 8 is a flowchart showing the steps to be taken in calculating air injection flow values using system pulsation data.

The best mode known to the inventor for carrying out the present invention as of the filing date hereof has been shown and described herein, but it will apparent to those skilled in the art that suitable modifications, variations and equivalents may be made without departing from the scope of the invention, such scope being limited solely by the terms of the following claims and the legal equivalents thereof.

The invention claimed is:

1. A method of injecting secondary air into an exhaust of an automotive vehicle with a catalytic converter, such method comprising:

providing an air injection system, the air injection system having:

a source of pressurized air;

a conduit for carrying pressurized air from the source to an exhaust pipe from the vehicle; and a variable flow rate valve in the conduit for controlling the rate of airflow through the conduit;

injecting pressurized air from the conduit of the air injection system through the variable flow rate valve into the exhaust pipe at a location upstream of the catalytic converter;

collecting air injection system pressure data;

collecting air injection system pulsation data;

calculating at least one air injection flow value from the air pressure data as a function of engine airflow data;

determining if there is a unique air injection flow value calculated from the air pressure data as a function of engine flow data;

calculating a unique air injection flow value from the system pulsation data as a function of engine airflow data if there is not a unique air injection flow value calculated from the air pressure data as a function of engine flow data;

reporting the unique air injection flow value; and controlling the rate of airflow through the variable flow rate valve into the exhaust pipe as a function of the unique air injection flow value.

2. The method according to claim 1 and further comprising:

providing an on-off solenoid valve in the conduit between the source of pressurized air and the variable airflow rate valve.

3. A method according to claim 1 wherein:

the air injection system pressure pulsation is calculated as the difference between air injection system pressure and averaged air injection system pressure over time.

4. The method according to claim 3 wherein:

the step of providing a variable flow valve is accomplished by providing a Reed valve.

* * * * *